United States Patent [19]
Gupta

[11] Patent Number: 5,769,238
[45] Date of Patent: Jun. 23, 1998

[54] APPARATUS FOR CLEANING AND DESTONING BEANS, PEAS, AND OTHER FOODS OF PARTICULATE FORM

[76] Inventor: Vijai P. Gupta, 816 Newtown Rd., Berwyn, Pa. 19312

[21] Appl. No.: 576,225

[22] Filed: Dec. 21, 1995

[51] Int. Cl.$^6$ ............................................. B03B 7/00
[52] U.S. Cl. ........................................... 209/158; 209/159
[58] Field of Search ................................. 209/158, 159, 209/173, 172.5, 208

[56] References Cited

U.S. PATENT DOCUMENTS

| | | | |
|---|---|---|---|
| 2,857,050 | 10/1958 | Nebel | 209/159 |
| 3,097,159 | 7/1963 | Ofner | 209/2 |
| 3,312,341 | 4/1967 | Weincke et al. | 209/158 |
| 3,606,946 | 9/1971 | Zenz et al. | 209/159 |
| 3,708,063 | 1/1973 | Morimasa | 209/158 |
| 4,340,143 | 7/1982 | Moshofsky et al. | 209/158 |
| 4,466,542 | 8/1984 | Oetiker et al. | 209/44.2 |
| 4,483,768 | 11/1984 | Gazzoni | 209/158 |
| 4,784,757 | 11/1988 | Nelson et al. | 209/159 |
| 4,913,803 | 4/1990 | Earls et al. | 209/7 |
| 4,946,584 | 8/1990 | Olney | 209/158 |

Primary Examiner—Karen M. Young
Assistant Examiner—Gregory A. Morse

[57] ABSTRACT

The present invention provides an apparatus for cleaning particulate materials which readily sink in water, being slightly heavier than water, such as beans, peas, grains, etc.; by removing much heavier particulates such as stones, glass, metal pieces, etc., and, by also removing particulates which either float or sink very slowly in water, such as plant stems and leaves, dead insects, bean pods, husks, dust etc. Differences in settling velocities in water are used to separate groups of particulate materials, by allowing the particulates to float or settle through two columns filled with water. The columns have water flowing upward at different velocities, or water flowing upward through one column and stagnant water in the other column.

14 Claims, 2 Drawing Sheets

APPARATUS FOR CLEANING AND DESTONING BEANS, PEAS, AND OTHER FOODS OF PARTICULATE FORM

FIELD OF THE INVENTION

This invention relates to the cleaning of particulate materials that are slightly heavier than water, with a specific gravity (20°/20° C.) range of 1.01 to 2.01 and thus readily sink in water, by the removal of foreign particulate objects that are: 1. lighter than water and thus float, 2. are of such size and shape as to sink very slowly albeit being heavier than water, and 3. are much heavier than water and sink rapidly in water. The applications of this invention are in the fields of cleaning dry or water soaked beans, peas, grain or other foods by the removal of stones and other heavy foreign objects such as metal pieces, glass pieces, etc., and also, by the removal of light debris such as plant leaves and stems, bean pods, soil, grain dust, etc.

DESCRIPTION OF PRIOR ART

Processes for the cleaning of granular materials are numerous and well known. In the food industry, dry beans are processed through 'destoners', where water flowing over a pan with V-shape corrugations, carries the beans over the peaks of the V's, while the stones are caught and remain in the valleys of the V's. Another version of the common destoners is the 'Riffle Board' with inclined baffles on a flat surface, where flowing water carries the beans over the baffles, while the stones are trapped between the baffles. Yet another variation for destoning with water consists of a shallow cyclone of water in which the beans are introduced in the vortex, the stones travel down to the bottom with the centrifugal force, while the beans are carried upward and out by overflowing water. Such devices have high energy consumption because of the many obstructions provided for the water to flow, and have a very limited capacity for stones, and often misperform if the water velocity is not well controlled and maintained uniform across the width of the pan. Periodic discharge of the collected stones is necessary and some loss of beans occurs with the stones discharged. The aforementioned devices are not capable of removing light debris that floats or settles very slowly, e.g., plant leaves and stems, bean pods, soil, grain dust, dead insects etc., from the desired product. Such light debris often constitutes a major portion of the impurities in food particulates such as beans and peas.

U.S. Pat. No. 4,913,803 describes a process for the separation of similarly sized particles having different terminal velocities. A sieving step is carried out first, to remove smaller and/or larger particles to produce a mixture of 'similarly sized' particles. Except for the mixtures of anion and cation exchange resins, which are nearly perfect spheres of nearly the same size, as cited, the principles of U.S. Pat. No. 4,913,803 can not be readily applied to natural granular materials such as peas and beans, which have a wide range of particle shapes and sizes. Furthermore, there is no provision to remove particles that have no 'terminal velocity', i.e., that do not sink in water.

U.S. Pat. No. 4,784,757 describes an apparatus for the separation of mineral ores of different specific gravities. Water is used to separate materials that have a lower settling velocity from those that have higher settling velocities, thus, dividing the starting material into two or more fractions heavier than water. No provision is made to separate materials that have very low, or no settling velocity.

U.S. Pat. No. 3,097,159 describes an apparatus using water, for the cleaning of granular materials, such as wheat, where the particulates are well mixed with water with agitation, then separated into fractions of different densities via froth flotation in a centrifuge. U.S. Pat. No. 4,466,542 uses fluidization of grains and cereals with air to separate those into light, medium and heavy grain fractions.

It would be quite advantageous to have a food cleaning apparatus that is simple to construct and easy to operate and maintain, can operate with low energy and water consumption, and has high reliability in separating the light particulates, e.g., plant leaves and stems, dead insects, grain dust etc. and heavy particulates, e.g., metal and glass pieces, stones etc., from the desired medium density range food particulates.

SUMMARY OF THE INVENTION

Particulate material, such as dry peas or beans, herein referred to as 'feed', is introduced into a column with stagnant water, or water flowing upwardly at a very small velocity, so that materials that float or sink very slowly in water, are carried up to the surface of the water in that column, and accumulate there in case of stagnant water or, are removed from the column via a small flow of water taken over a weir or stand pipe which carries such floating material out of the column. The heavier particles flow downward and enter a second column where water is flowing upwardly at a velocity sufficiently high to carry the desired particulates, such as peas and beans upward, while the heavier particulates such as stones, glass and metal fall to the bottom of the second column. Air may be introduced as small bubbles, in the first column to assist in the upward movement of the light particulates, based on the well known principles of froth floatation. Discharge of water from the apparatus occurs through weirs, dams, stand pipe etc., which maintain the overflow from a water level at atmospheric pressure.

DETAILED DESCRIPTION

Figure 1:
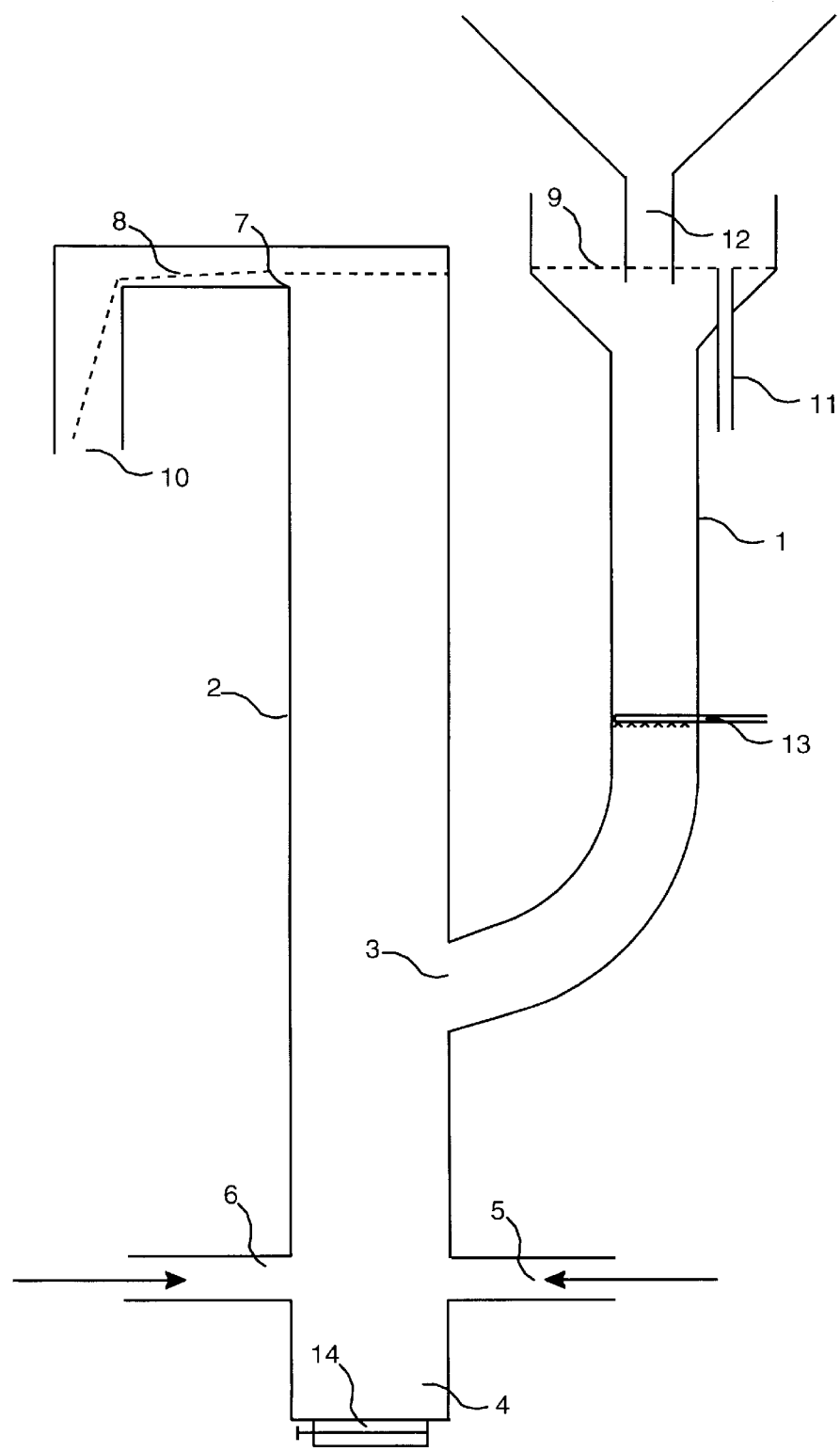
FIG. 1 is a schematic illustration of apparatus embodying one form of the invention.

Referring to FIG. 1, the apparatus consists of two nearly vertical columns 1 and 2. Column 1 is connected to column 2 through an entry port 3 which is below the top of column 2 and at least 6 inches above the bottom end 4 of column 2, such that particles falling through column 1 will enter column 2 at some point between the top and bottom of column 2. Water inlets 5 and 6, allow water flow to be introduced into column 2 at points between port 3 and bottom end 4. Water may be introduced through just one or a multitude of inlet points. The bottom of column 2 has provisions that allow for the removal of heavy particles collecting there, either on a continuous basis via mechanical means, such as a bucket elevator or an auger, or intermittently, via a clean out plug or a discharge valve 14, as shown.

Heights of the water levels 8 and 9 in the two columns are such that when water flow is initiated, most or all of the incoming flow goes out through weir 7, as shown, at the top of column 2. Effective height of water level 9 in column 1 is somewhat greater than that of the water level 8 in column 2, so that water flows out either mostly or entirely through the top of column 2, while a stand pipe 11 as shown, or a weir of adjustable height allows a small flow or no flow of water through the top of column 1. It will be noted that flow of water out of the apparatus occurs from water surfaces that are at atmospheric pressure, avoiding energy losses that occur when control devices such as valves are used, and reducing the cost of the apparatus.

Water is introduced through lines 5 and 6 at a rate such that the desired particles viz., beans, peas etc. are carried upward with the flow of water, while the undesired heavier particles such as stones and metal pieces continue to fall and collect at the bottom 4 of column 2. The average water velocity through the cross section of column 2 will preferably be in the range of 5 to 200 cm/sec while that through column 1 will preferably be in the range of 0 to 20 cm/sec. A more preferable average velocity range is 6 to 50 cm/sec through column 2 and 0 to 10 cm/sec through column 1. The average water velocity through column 2 must always be higher than that through column 1. The suitable water velocity through each column is dependent upon the size, shape and density of the desired particulates as well as those for the impurities being removed, and is also somewhat dependent upon the density of the water being used. The diameter of each column can be as large as necessary to obtain the desired production rate, but it should preferably be at least 1 cm for each column and more preferably, at least eight times the average projected diameter of the desirable particulates. It is also preferable that either the entire columns 1 and 2, or at least parts thereof, be made of transparent material for visibility through the column. It is to be understood that the columns may have cross sectional forms other than circular, e.g., rectangular or oval.

To start the cleaning process, a flow of water is established through lines 5 and 6, at the desired rate, thereby establishing a water level 8 in column 2 and 9 in column 1. Most or all of the in-flowing water flows out of column 2 via outlet 10, as shown. Height of the weir or stand pipe 11 in column 1 is adjusted so as to get the desired overflow of water out of column 1. Water level 9 in column 1 will be slightly higher than level 8 in column 2, because most or all of the flow will be through column 2.

Feed is introduced into column 1 via line 12. Column 1 may have an enlarged hopper like open end, as shown, which will facilitate introduction of the feed particles, as well as provide lower linear water velocity, so as not to carry upward, particles that are expected to sink. It is preferable that line 12 dip below the surface of water 9 as a dip leg, to minimize disturbances on the surface of water in column 1. Particles that float or sink very slowly, float up to the surface of water in column 1, whence, a small discharge of water, carries those materials out. In case of no water being removed from column 1, such light particles will accumulate at the surface of water there. In operations where the amount of light particles to be removed per batch is small, it may be desirable to let those particles accumulate at the surface, to be removed at the end of the run. In extended runs, or in case the feed contains significant amount of light particles, continuous removal of the light particles will be necessary, as otherwise, those particles will build-up in the feed introduction area, and may even plug up the lines, or will be purged from the apparatus along with the desirable particles in the second fraction, thus re-contaminating the desired food particulates.

Depending upon the nature of the material to be cleaned, for example, in cleaning wheat where there is much dust, it would be desirable to introduce a small flow of air in column 1, via line 13 and below the water level 9, to aid in the upward movement of the fines, based on the principles of froth floatation. The upward-travelling air bubbles resulting from air flow help carry the light fraction upwardly to the water surface.

Particles that sink through column 1, enter the upward flowing water stream in column 2, where depending upon the water velocity, a separation of lighter and heavier particles occurs, with the lighter particles flowing upward and exiting the apparatus with the overflowing water, while the heavier particles settle to the bottom 4. Water velocity is adjusted so as to allow for most of the desired particles to be carried up and out by the flowing water. Because of a significant difference in the settling velocities of the desired particles, viz. beans, peas etc. and those for the undesired foreign matter, e.g., stones, metal and glass particles etc., it is not particularly difficult to adjust the water flow as to obtain the desired separation. Water velocity required to effect the desired separation is different for different species of beans, peas, etc. because of the differences in the projected cross-sectional areas and densities of the different species, which in turn cause differences in settling velocities. It would be preferable to operate at water velocity such that some of the desired particles sink a short distance after entering column 2, before those are picked up and carried back-up by the flow of water.

Particles that are carried out with the flowing water are separated from the water, which may be recycled or purged. Conventional de-watering devices such as vibrating screens are used to separate the desired particles from water, producing clean particles free from foreign objects.

Heavy particles that settle to the bottom 4 in column 2 are either continuously or periodically removed from the apparatus by suitable means, such as pointed out hereinabove.

Figure 2:
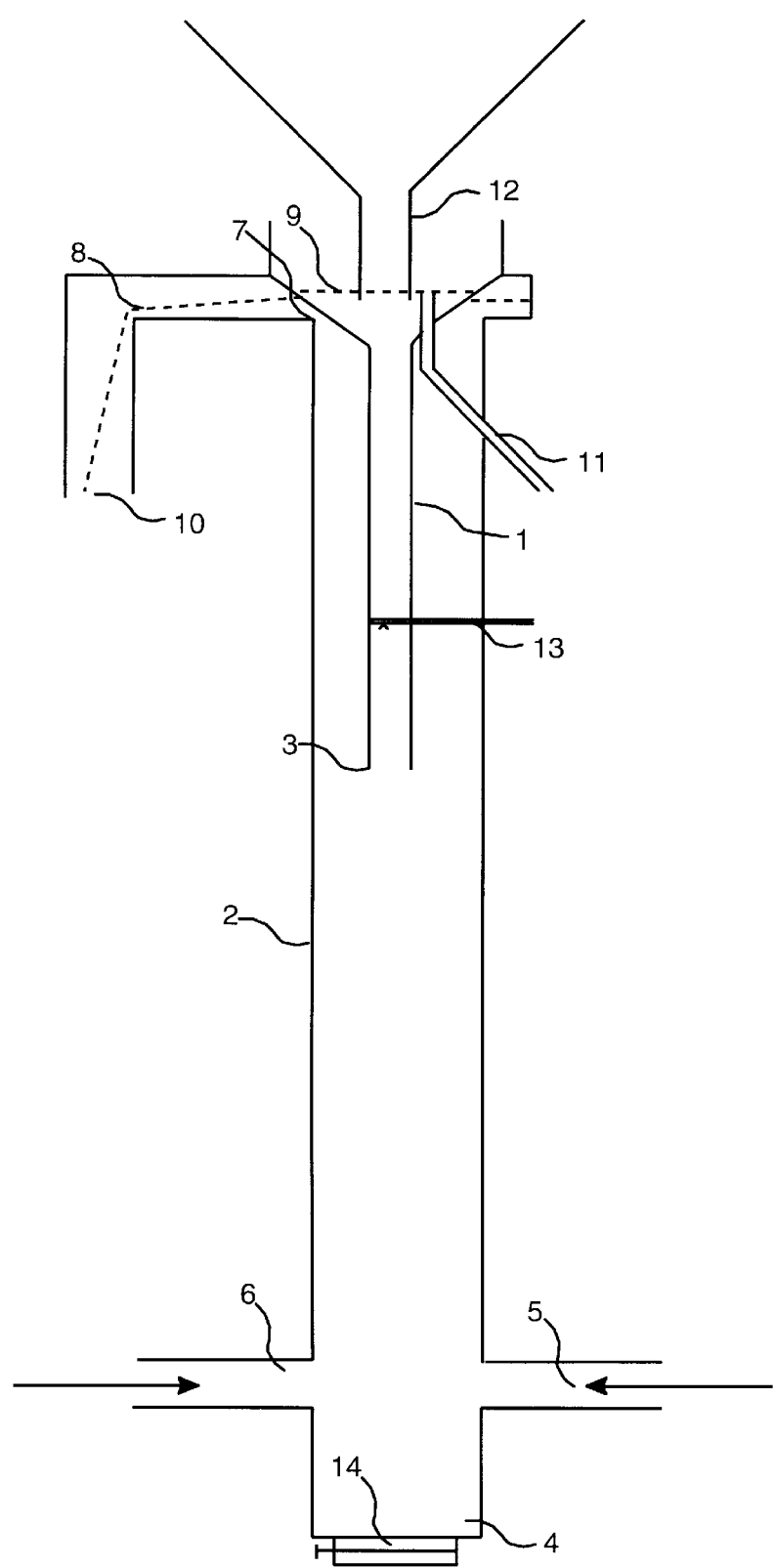
FIG. 2 is a schematic illustration of apparatus embodying a second form of the invention.

In a second embodiment of the invention, schematically shown in FIG. 2, column 1 is located within column 2, providing an annular space between the two columns, with the feed particles dropping through the inner column 1 into the upward flowing water stream in column 2, which flows upward through the annular passage surrounding column 1. While this arrangement is workable, the embodiment of FIG. 1 which includes the laterally spaced columns is preferred because there is no velocity change caused by the change in cross-sectional area available for the flow of water when the two columns are separate, as would happen with the two concentric columns, where the flow of water is through the entire column 2 until it reaches the annulus, which is of smaller cross-sectional area, thus increasing the water velocity through the annulus. In FIG. 2, the opening 3 at the lower end of column 1 is considered to be the entry port to column 2, which port is located between the upper and lower ends of column 2.

While I have shown and described particular embodiments of my invention, it will be obvious to those skilled in the art that various changes and modifications may be made without departing from my invention in its broader aspects; and I, therefore, intend herein to cover all such changes and modifications as fall within the true spirit and scope of my invention.

What I claim as new is:

1. Food-cleaning apparatus for separating into three fractions feed particulate matter in which said three fractions are mixed, a first one of said fractions consisting of particles that float or sink slowly in stagnant water, a second one of said fractions consisting of particles of food that sink more rapidly than the said first fraction in stagnant water but which if introduced into water flowing upwardly at an average velocity of a predetermined minimum value or higher will be carried upwardly by said upwardly-flowing water, and a third one of said fractions consisting of particles that will sink if introduced into water flowing upwardly at said predetermined minimum value, said apparatus comprising:

(a) first and second substantially vertical columns, each having a lower and an upper end, the lower end of the first column being connected to the second column through an entry port located at a point between the ends of the second column, (b) means for causing water to flow upwardly through said second column at an average velocity exceeding said predetermined minimum value and for causing water in said first column to flow upwardly through said first column at a low average velocity less than the said predetermined minimum value or to remain stagnant, (c) means for introducing said feed particulate matter into said first column while water in said first column is either stagnant or flowing upwardly at an average velocity below said predetermined minimum value and water in second column is flowing upwardly at an average velocity exceeding said predetermined minimum velocity, thereby causing said first fraction to be carried to the upper surface of the water in said first column and causing said second and third fractions to sink through the water in said first column past the lower end thereof and through said entry port into the upwardly flowing water in said second column, and in which:

(d) the particulate matter entering the upwardly-flowing water in said second column from said first column is separated within said second column into said second and third fractions, the third fraction sinking toward the lower end of said second column while the second fraction is carried by the upwardly-flowing water toward the upper end of said second column, (e) means is provided for removing said second fraction from the upper end of said second column via a first path, and (f) means is provided for removing said first fraction from the upper surface of the water present in said first column via a second path that is separate from said first path, whereby said first and second fractions remain separated.

2. The apparatus of claim 1 in which the water in both said first and second columns is controlled in such a manner that during separation of said fractions, an upper surface exposed to atmospheric pressure is present on the water in each of said two columns.

3. The apparatus of claim 2 in which the upper surface level of the water in said first column is controlled by a stand pipe that is vertically adjustable and has an entry opening and an exit opening, the entry opening being at the upper surface of the water in said first column and the exit opening being located beneath said entry opening and outside said first column.

4. The apparatus of claim 2 in which the upper surface level of the water in said second column is controlled by means forming a dam at the top of said second column over which water containing said second fraction flows.

5. Apparatus as defined in claim 1 and further comprising means for introducing a flow of gas into the water in said first column at a location below the upper surface of the water in the said first column for producing upwardly moving gas bubbles in said first-column water for facilitating upward movement of said first fraction in said first-column water, the flow of gas being controlled at such a rate that said second fraction is free to sink through the water in said first column and at least some of the bubbles remain distinct until reaching the upper water surface.

6. The apparatus of claim 5 in which the feed particulate matter is wheat containing grain dust and said first fraction comprises said grain dust.

7. The apparatus of claim 1 in which said means for introducing said feed particulate matter into said first column comprises a line through which the feed particulate matter flows into said first column, said line having an exit opening normally located below the water level in said first column.

8. The apparatus of claim 7 in which said means for removing said first fraction removes floating particles of said first fraction from the upper surface of the water present in said first column.

9. The apparatus of claim 1 in which said first column is located outside said second column in side-by-side relationship to said second column.

10. The apparatus of claim 1 in which said first column is located within said second column in spaced relationship to said second column so that the upwardly-flowing water in said second column flows upwardly through the space around said first column.

11. The apparatus of claim 1 in which the average water velocity in said second column is in the range of 5 to 200 cm/sec and the average water velocity in said first column is in the range of 0 to 20 cm/sec.

12. The apparatus of claim 1 in which the average water velocity in said second column is in the range of 6 to 50 cm/sec and the average water velocity in said first column is in the range of 0 to 10 cm/sec.

13. The apparatus of claim 1 in which the particles of said second fraction are beans, peas, or grains and the particles of said third fraction are of materials having a greater density than the particles of said second fraction.

14. The apparatus of claim 1 in which said means of paragraph (f) removes floating particles of said first fraction from the upper surface of the water present in said first column.

* * * * *